(12) United States Patent
Craig

(10) Patent No.: US 11,406,221 B2
(45) Date of Patent: Aug. 9, 2022

(54) UTILITY SKIRT FOR WIRE CHAFING DISH RACK

(71) Applicant: Kimberly Walker Craig, Farmington Hills, MI (US)

(72) Inventor: Kimberly Walker Craig, Farmington Hills, MI (US)

( * ) Notice: Subject to any disclaimer, the term of this patent is extended or adjusted under 35 U.S.C. 154(b) by 8 days.

(21) Appl. No.: 17/156,566

(22) Filed: Jan. 23, 2021

(65) Prior Publication Data

US 2021/0137308 A1   May 13, 2021

Related U.S. Application Data

(60) Provisional application No. 62/965,108, filed on Jan. 23, 2020.

(51) Int. Cl.
| | |
|---|---|
| *F24C 15/36* | (2006.01) |
| *A47J 36/24* | (2006.01) |
| *F16B 5/00* | (2006.01) |
| *A47J 47/14* | (2006.01) |

(52) U.S. Cl.
CPC ........... *A47J 36/2405* (2013.01); *A47J 47/14* (2013.01); *F16B 5/0036* (2013.01); *F24C 15/36* (2013.01)

(58) Field of Classification Search
CPC ..... A47J 36/2405; A47J 47/14; F16B 5/0036; F24C 15/36; F24B 13/002
USPC ................................................ 126/9 R, 201
See application file for complete search history.

(56) References Cited

U.S. PATENT DOCUMENTS

| | | | | |
|---|---|---|---|---|
| 2,629,370 | A * | 2/1953 | Janski | F24C 15/36 126/201 |
| 4,865,015 | A * | 9/1989 | Hasty | F24C 15/36 5/493 |
| 5,117,807 | A * | 6/1992 | Graulich | F24C 15/36 160/237 |
| 5,813,396 | A * | 9/1998 | Bessette | F24C 15/36 126/214 D |
| 5,881,637 | A * | 3/1999 | Strickel | A62C 8/06 D7/366 |
| 6,918,387 | B2 * | 7/2005 | Klarich | F24C 15/36 126/29 |
| 10,307,015 | B1 * | 6/2019 | Shane | A47J 39/006 |
| 2005/0076795 | A1 * | 4/2005 | Riddle | A47J 36/24 99/483 |
| 2007/0151557 | A1 * | 7/2007 | McNelly | A47J 36/26 126/201 |

(Continued)

*Primary Examiner* — Jacob K Ackun
(74) *Attorney, Agent, or Firm* — Barry Choobin; Patent 360

(57) ABSTRACT

A utility skirt for a wire chafing dish rack, wherein the utility skirt is folded around the wire chafing dish rack. The utility skirt having an upper edge, a lower edge, a left edge, and a right edge defining an area of the utility skirt. The upper edge of the utility skirt runs along the upper rim of the wire chafing dish rack. Three tabs extend from the left edge and three slits are made in the utility skirt near the right edge. The three tabs can interlock with the three slits for coupling the left edge to the right edge. Three fold lines divide the utility skirt into four sections, each of the four sections corresponds to the four sides of the wire chafing dish rack. Rim-tabs from the upper edge of the utility skirt folds over the upper rim for supporting the utility skirt over the wire chafing dish rack.

10 Claims, 2 Drawing Sheets

(56) References Cited

U.S. PATENT DOCUMENTS

| | | | |
|---|---|---|---|
| 2008/0115779 A1* | 5/2008 | Gibson | A47J 37/0713 126/201 |
| 2012/0118513 A1* | 5/2012 | Melhuish | F28F 25/12 292/195 |
| 2015/0108286 A1* | 4/2015 | Barnes | A47J 43/287 248/37.6 |
| 2018/0235400 A1* | 8/2018 | Jones | A47J 36/2405 |
| 2019/0191924 A1* | 6/2019 | Smalls | A47J 36/24 |

* cited by examiner

UTILITY SKIRT FOR WIRE CHAFING DISH RACK

CROSS-REFERENCE TO RELATED APPLICATIONS

This application claims priority to the U.S. provisional patent application Ser. No. 62/965,108, filed on Jan. 23, 2020, which is incorporated herein by reference in its entirety.

FIELD OF INVENTION

The present invention relates to a utility skirt for wire chafing dish rack, and more particularly, the present invention relates to a replaceable and aesthetic utility skirt of a wire chafing dish rack.

BACKGROUND

A wire chafing dish rack is a one-piece wireframe used to support dishpans. These are typically utilitarian devices used in gatherings to serve food. Can be made of metallic material, such as aluminum or steel, the racks can also incorporate fuel heaters for keeping the food items warm. Structurally, the rack is a wireframe having an upper rim, a lower rim, and multiple legs that extend between the upper and the lower rim. A pan can be supported over the upper rim, wherein the flange of the pan is retained over the upper rim. Two handles can be provided on the upper rim for handling the rack.

Such a utilitarian fire frame chafing rack has several disadvantages. First, the wireframe is unaesthetic in appearance. Since, the wire chafing dish racks are used in gatherings, particularly by caterers, the utilitarian appearance of traditional wire chafing dish rack is a big drawback. Second, the burners placed below a dishpan tend to quiver by air which results in heat loss. Additionally, much of the heat is dissipated away from the dishpan, resulting in inefficient heating and waste of energy.

Thus, a need is appreciated for a device that can overcome the above drawbacks of the traditional wire chafing dish racks.

SUMMARY OF THE INVENTION

The following presents a simplified summary of one or more embodiments of the present invention in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention therefore directed to a utility skirt for a wire chafing dish rack.

It is another object of the present invention that the utility skirt reduces the escape of the heat to the environment.

It is still another object of the present invention that the utility skirt acts as a barrier between external air and the flame of a burner.

It is a further object of the present invention that the utility skirt can be retrofitted to a wire chafing dish rack.

It is still a further object of the present invention that the utility skirt can be quickly installed and removed from a wire chafing dish rack.

It is an additional object of the present invention that the utility skirt provides an aesthetic appearance to a wire chafing dish rack.

It is yet another object of the present invention that the utility skirt is economical to manufacture.

In one aspect, disclosed is a utility skirt of an elongated configuration having a proximal end and a distal end. The length of the utility skirt between the proximal end and the distal end can be proportional to a perimeter of an upper rim of a wire chafing dish rack. The proximal end having two or more tabs and the distal end having two or more slits, such as the two or more tabs can interlock with the two or more slits.

In one aspect, the utility skirt having an upper edge that extends between the proximal end and the distal end. The upper edge having at least three tabs extended upwards away from the utility skirt, wherein the at least three tabs can fold over the upper rim of the wire chafing dish rack. The three tabs on the upper edge of the utility skirt are spaced apart, such as the at least three tabs can fold over at least two opposite sides of the upper rim of the wire chafing dish rack.

In one aspect, the utility skirt having at least two fold-lines that traverse along the width and perpendicular to the upper edge of the utility skirt. The at least two-fold lines divide the utility skirt into at least three sections, wherein the lengths of sections are commensurate with lengths of the sides of the upper rim of the wire chafing dish rack.

In one aspect, the utility skirt is having a left edge, a right edge, upper edge, and a lower edge defining an area of the utility skirt, the area having a die-cut or laser-cut pattern.

In one aspect, the upper edge of the utility skirt having two elongated indentions that extend along the length of the utility skirt, the length of the elongated indentions can be commensurate with the length of the handle of the wire chafing dish rack. The depth of the elongated indentions can be commensurate with the thickness of the wireframe of the wire chafing dish rack.

In one aspect, the upper rim of the wire chafing dish rack is of a rectangular geometry, and the utility skirt can have four tabs on the upper edge. The four tabs spaced apart such as to fold over to at least two opposite sides of the upper rim. The width of the utility skirt is less than the height of the wire chafing dish rack.

In one aspect, the utility skirt can be made from a one-piece Aluminum sheet having a thickness of about 0.05 mm gauge. The Aluminum sheet having cutouts over the area of the utility skirt forming a pattern. The lower edge of the utility skirt having cutout arches, the number of arches can be proportional to the number of sides of the upper rim of the wire chafing dish rack.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
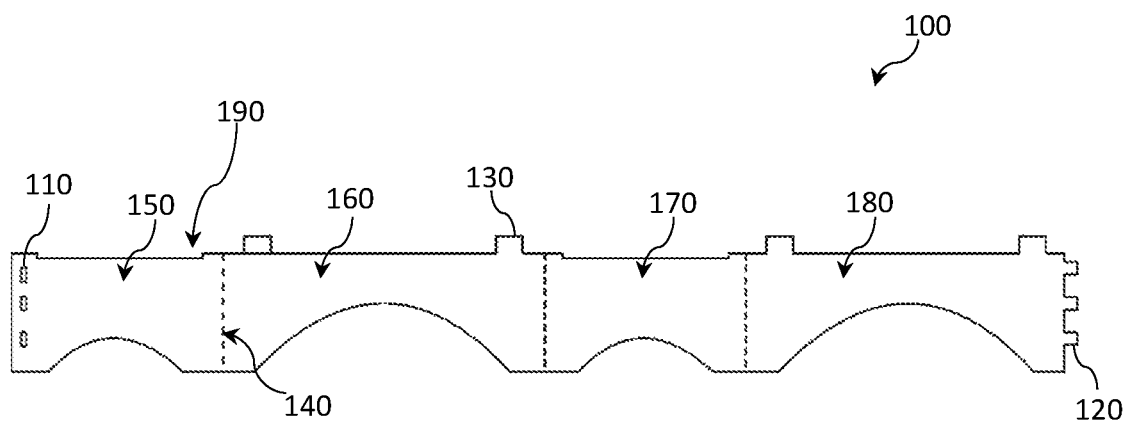
FIG. 1 shows an outline view of the utility skirt, according to an exemplary embodiment of the present invention.

The present invention is directed to a utility skirt for a wire chafing dish rack. Referring to FIG. 1 which shows an outline view of the utility skirt. The utility skirt can be made from a single sheet of any rigid material, such as a metal. For example, the utility skirt can be manufactured from an aluminum sheet by die or laser cutting process in one or more steps. Dies having molds of different patterns can be used to manufacture the utility skirts of different patterns. Alternatively, the designs can be formed by laser cutting. The utility skirt 100 shown in FIG. 1 is having a proximal end and a distal end along the length of the utility skirt. The utility skirt having an upper edge, a lower edge, a left edge, and a right edge defining an area of the utility skirt. The utility skirt shown in FIG. 1 can be suitable for a wire chafing dish rack having an upper rim of rectangular geometry. The proximal end of the utility skirt 100 having three spaced slits 110 along its width. The opposite end, i.e., the distal end having three spaced slits 120 along the width of the utility skirt 100. The position of three slits 120 can correspond to the three tabs 110, such as the three tabs 110 can be inserted into the three slits 120 for coupling the proximal end to the distal end. The tabs upon inserted into the slits can bent to interlock the proximal end of the utility skirt to its distal end.

Figure 2:
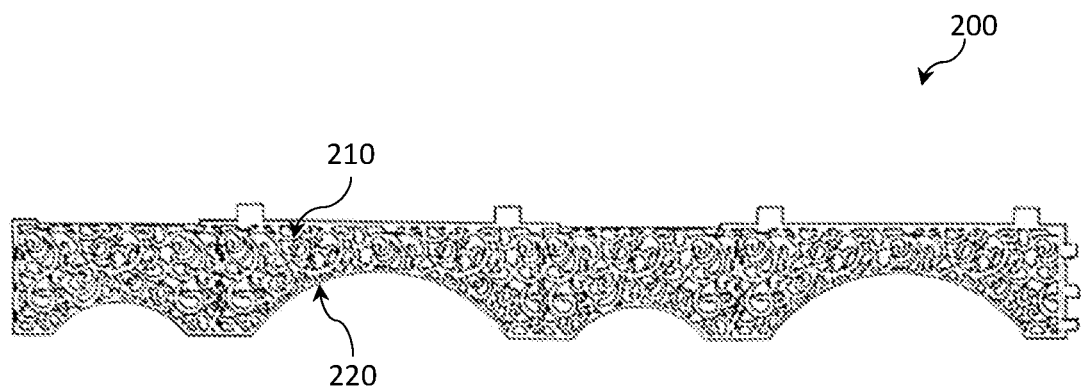
FIG. 2 shows a front view of the utility skirt, according to an exemplary embodiment of the present invention.

The utility skirt 100 can be folded around a wire chafing dish rack, wherein the upper edge of the utility skirt 100 juxtapose to the upper rim of the wire chafing dish rack. The upper edge can have several rim-tabs that extends upwards and away from the utility skirt 100. The rim-tabs 130 can fold over the upper rim of the wire chafing dish rack for supporting the utility skirt 100. FIGS. 1 and 2 show four rim-tabs 130 that can be folded over the opposite long sides of the upper rim of the wire chafing dish rack.

The utility skirt 100 further having three-fold lines 140 along which the utility skirt can be folded for skirting around a wire chafing dish rack. The number of fold lines can be proportional to the number of sides of a wire chafing dish rack. For example, for a triangular-shaped wire chafing dish rack, the utility skirt can have two-fold lines. FIGS. 1 and 2 show three-fold lines for a rectangular shape wire chafing dish rack. The distance between the fold lines can be proportional to the length of sides of the wire chafing dish rack, such as the utility skirt can be folded at corner edges of the wire chafing dish rack. The three-fold lines 140 in FIG. 1 divides the utility skirt 100 into four sections 150, 160, 170, and 180. Sections 150 and 170 are short and cover the short sides of the rectangular wire chafing dish rack. Sections 160 and 180 are long and can cover the long sides of the rectangular wire chafing dish rack.

The upper edges of the smaller sections 150 and 170 can also have indentions 190 that fit around two opposite handles of the wire chafing dish rack. The depth of the indentions 190 can be proportional to the thickness of the wireframe of the wire chafing dish rack. The length of the indentions 190 can be commensurate with the length of handles of the wire chafing dish rack.

FIG. 2 shows a front view of the utility skirt 200 having a pattern 210. Pattern 210 can be formed by die-cutting or laser-cutting. The utility skirt 200 can be folded along its fold lines around the wire chafing dish rack, wherein the upper edge of the utility skirt 200 juxtapose with the upper rim of the wire chafing dish rack. The lower edge having cutout arches 220, wherein each section is having an arch along the lower edge. Such cutouts can be optional.

Figure 3:
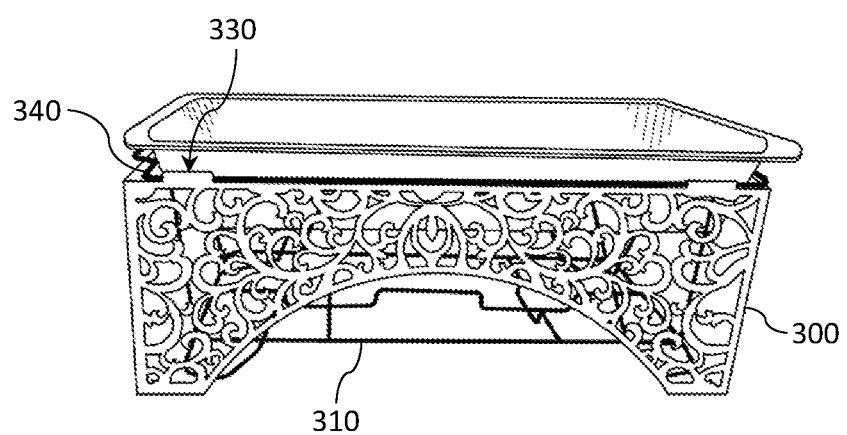
FIG. 3 shows the utility skirt mounted on a wire chafing dish rack, the wire chafing dish rack supporting a dishpan, according to an exemplary embodiment of the present invention.

FIG. 3 shows the utility skirt 300 that is folded around a wire chafing dish rack 310. The utility skirt 300 can be folded at its fold lines around the wire chafing dish rack. The tabs at the proximal end can be inserted in the slits at the distal end of the utility skirt. The tabs can then be bent to interlock with the slits. To further support the utility skirt on the wire chafing dish rack, the rim-tabs 330 can be folded over the upper rim 340 of the wire chafing dish rack. FIG. 3 shows the rim-tabs 330 folded over the upper rim 340.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A utility skirt for a wire chafing dish rack, the wire chafing dish rack having an upper rim, the upper rim having at least three sides, the utility skirt comprising:
   an elongated panel having a length proportional to a perimeter of the upper rim, the panel having an upper edge, a lower edge, a left edge, and a right edge defining an area of the panel;
   at least one tab that extends from the left edge and away from the panel;
   at least one slit made in the panel near the right edge, wherein the at least one slit is configured to receive the at least one tab for coupling the left edge to the right edge;
   two or more rim-tabs that extends from the upper edge and away from the panel, where the two or more rim-tabs are configured to couple to at least two opposite sides of the upper rim; and
   at least two fold-lines that extend between the upper edge and the lower edge of the panel, the at least two fold lines divide the panel into at least three sections, wherein lengths of each the at least three sections is proportional to lengths of the at least three sides of the upper rim.

2. The utility skirt according to claim 1, wherein the utility skirt further comprises at least two elongated indentions along the upper edge, the at least two indentions configured to juxtapose to two handles attached to the upper rim, the length of each at least two elongated indentions is commensurate to length of the two handles.

3. The utility skirt according to claim 1, wherein the utility skirt is formed from a one-piece aluminum sheet.

4. The utility skirt according to claim 1, wherein the utility skirt is further having a pattern over the area of the panel, the pattern formed by laser-cutting of the panel.

5. The utility skirt according to claim 2, wherein three tabs extends from the left edge, three slits in the panel near the right edge, the three tabs configured to engage with the three slits, three fold lines divide the panel into two long sections and two short sections, wherein a length of each of the two long sections is proportional to a long side of the upper rim and lengths of each of the two short sections is proportional to lengths of the two short sides of the upper rim, two rim-tabs extends from the upper edge of each of the two long sections.

6. The utility skirt according to claim 5, wherein each of the two short sections having one of the at least two elongated indentions.

7. A wire chafing dish rack comprising:
   a frame rack comprising:
      an upper rim of a rectangular geometry, the upper rim having two opposite long sides and two opposite short sides, and
      four corner legs that extend downwards from four corners of the upper rim; and
   a utility skirt fold around the frame rack, the utility skirt comprising:
      an elongated panel having an upper edge, a lower edge, a left edge, and a right edge defining an area of the panel, the upper edge of the panel runs along the upper rim,
      three tabs that extend from the left edge of the panel;
      three slits made in the panel near the right edge, wherein the three slits are configured to receive the three tabs for coupling the left edge to the right edge, and
      three fold lines that extend between the upper edge and the lower edge and along the corner legs, three fold lines divide the panel into two long sections and two short sections, two rim-tabs extends from the upper edge of each of the two long sections, the four rim-tabs fold over the two opposite long sides of the upper rim.

8. The wire chafing dish rack according to claim 7, wherein the wire chafing dish rack further comprises two handles each coupled to the two opposite short sides, the utility skirt comprises two elongated indentions made in the upper edge along the two short sections, the two elongated indentions juxtapose with the two handles.

9. The wire chafing dish rack according to claim 7, wherein the area of the panel is having a laser-cut pattern.

10. The wire chafing dish rack according to claim 9, wherein each the two long sections and two short sections having an arch cutout along the lower edge.

* * * * *